US009942692B2

(12) United States Patent
Robbins et al.

(10) Patent No.: US 9,942,692 B2
(45) Date of Patent: Apr. 10, 2018

(54) ONE TOUCH MACHINE TO MACHINE DEVICE CONNECTION

(71) Applicant: Verizon Patent and Licensing Inc., Arlington, VA (US)

(72) Inventors: David C. Robbins, Grafton, MA (US); Paul T. Schultz, Colorado Springs, CO (US); Mark J. Hahn, Stow, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 850 days.

(21) Appl. No.: 13/953,163

(22) Filed: Jul. 29, 2013

(65) Prior Publication Data
US 2015/0032795 A1    Jan. 29, 2015

(51) Int. Cl.
*H04L 12/28*    (2006.01)
*H04W 4/00*    (2018.01)

(52) U.S. Cl.
CPC ......... *H04W 4/005* (2013.01); *H04L 12/2803* (2013.01); *H04L 12/2807* (2013.01); *H04W 4/001* (2013.01); *H04W 4/008* (2013.01)

(58) Field of Classification Search
CPC .......... H04L 12/2803; H04L 12/2807; H04W 4/008; H04W 12/06
See application file for complete search history.

(56) References Cited

U.S. PATENT DOCUMENTS

| 2008/0306740 | A1* | 12/2008 | Schuck | G06Q 50/22 704/275 |
| 2009/0182859 | A1* | 7/2009 | Motoyama | H04W 48/14 709/223 |
| 2009/0216446 | A1* | 8/2009 | Ma | G01C 21/20 701/469 |
| 2011/0075825 | A1* | 3/2011 | Balasaygun | G06F 9/45533 379/93.17 |
| 2012/0240191 | A1* | 9/2012 | Husney | H04W 12/04 726/3 |
| 2014/0068445 | A1* | 3/2014 | Kempf | G06Q 10/06312 715/736 |
| 2014/0181398 | A1* | 6/2014 | Bhat | G06F 3/0604 711/114 |
| 2014/0247941 | A1* | 9/2014 | Gu | H04L 63/062 380/270 |
| 2014/0281478 | A1* | 9/2014 | Huang | H04W 12/04 713/150 |

(Continued)

*Primary Examiner* — Jeong S Park

(57) ABSTRACT

A computing device may execute a device connection application on a processor of the computing device to provide operations including establishing an ad-hoc data connection between the computing device and a machine-to-machine device, the computing device configured to set up the machine-to-machine device to interact with a network-based service using a user account of the network-based service; receiving device information from the machine-to-machine device over the established ad-hoc data connection; and connecting the machine-to-machine device to the network-based service based on the device information received from the machine-to-machine device and according to authentication of the computing device as being associated with the user account. The computing device may further be configured to authenticate and authorize a user to configure the machine-to-machine device to join the network and network-based service.

22 Claims, 2 Drawing Sheets

(56) References Cited

U.S. PATENT DOCUMENTS

2014/0349746 A1\* 11/2014 Boudville ............. A63F 13/335
 463/29
2015/0181398 A1\* 6/2015 Garbin .................... H04W 4/16
 455/417

\* cited by examiner

ONE TOUCH MACHINE TO MACHINE DEVICE CONNECTION

BACKGROUND

To add a networked device to a system, a user of the system may be required to perform various network setup tasks. As an example, the user may be required to discover network identification and credentials by querying a network controller. As another example, the user may be required to create an ad-hoc user interface connection to the device in order to enter network identification and credentials so that the device can connect to the network. As yet a further example, the user may be required to manually provide to a service a device identifier (which may be hard to read and is almost certainly long and hard to remember), and possibly to the network controller. As another possibility, the user may be required to discover the device's address by querying the device or the network. As yet a further possibility, the user may be required to manually enter one or more of a device identifier and a device address into the service. These and other networked device setup tasks may be cumbersome, complex, and error-prone, especially when performed by relatively non-technical end users.

Networked application systems, such as monitored home security systems and home medical monitoring devices, continue to increase in popularity. Such systems may require the configuration and connection of networked devices (e.g., sensors, cameras, etc.) to a network based service. However, due to difficulties in configuring networked devices to the system, such systems enjoy only limited popularity.

DETAILED DESCRIPTION

Figure 1:
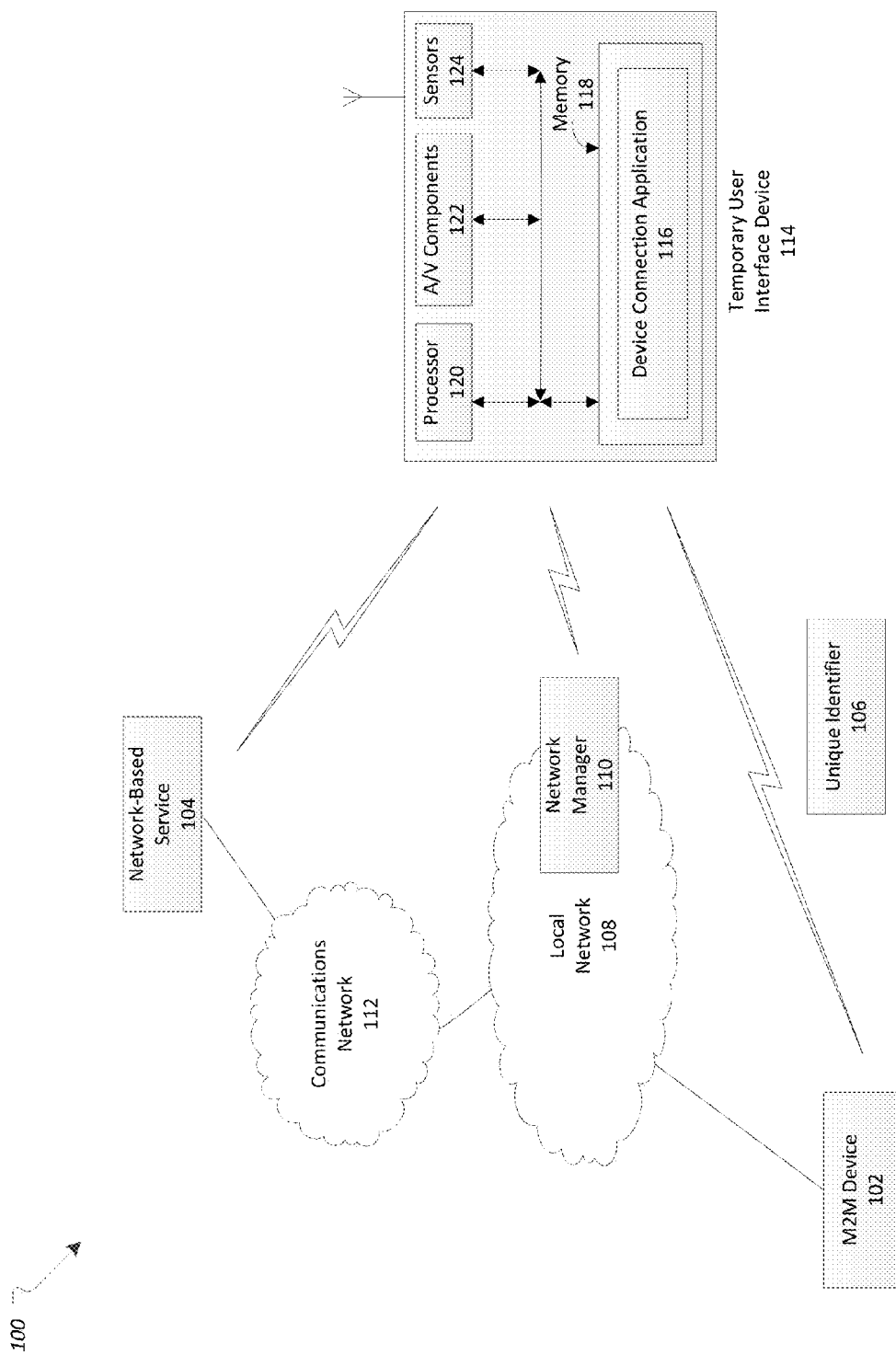
FIG. 1 illustrates an exemplary system facilitating the setup of a M2M device with a network-based service.

A machine-to-machine (M2M) device may be designed to communicate with a network-based service, once the M2M device and network-based service are configured to interact. However, the M2M device may lack a user interface, or may include a user interface through which configuration of the M2M device may be difficult or impossible for a user to perform.

A temporary user interface device (such as a smartphone, tablet, or laptop computer) may include functionality sufficient to communicate with the various components involved in configuration of the M2M device to operate with the network-based service. For example, the temporary user interface device may include features such as Internet or wireless network connectivity (e.g., Institute of Electrical and Electronics Engineers (IEEE) 802.11 wireless local area networking), ad-hoc networking connectivity (e.g., near-field communication (NFC) or Bluetooth), image and video capture functionality, audio capture functionality to capture voice or other audio input, sensors that capture location, environmental, and other data (e.g., global positioning system (GPS), barometer, temperature) and user interface displays. Using at least a subset of these features, the temporary user interface device may be configured to authenticate and authorize the user, execute a device connection application to allow the user's M2M device to establish a network connection to a network, and to configure the network-based service and the M2M device to interact via the established network connection. The temporary user interface device may be referred to as temporary, as the temporary user interface device is not required to be used once the M2M device has been set up. Thus, due to the features of the temporary user interface device, a device connection application installed on the temporary user interface device may be configured to set up the M2M device reliably and with a minimum of user interaction.

For example, the temporary user interface device may be configured to securely connect to the M2M device using its ad-hoc data connection connectivity (e.g., via NFC functionality of the temporary user interface device), and may automatically discover information over the ad-hoc data connection about the M2M device to be used to configure the M2M device to access the network. Use of the ad-hoc data connection to perform the network configuration may improve security over systems where the M2M device may blindly join nearby local networks to attempt to receive configuration information.

As another example, the temporary user interface device may be configured to identify a type of the M2M device, and based on the identified type may determine what configuration information to automatically discover and what information to request from the user. For instance, if the temporary user interface device identifies that the type of M2M device should have a device identifier located on the M2M device, the temporary user interface device may indicate to the user where that information is located on the M2M device to guide the user to provide the information (e.g., by way of a prompt displayed on a screen of the temporary user interface device, by way of an audio prompt provided by the temporary user interface device). Thus, in addition to capturing automatically discoverable information, the temporary user interface device may be further configured to help the user to provide information that may not be automatically discoverable.

Other features of the temporary user interface device may be utilized to facilitate the configuration. For instance, rather than relying on error-prone manual entry of non-automatically discoverable M2M device information, the temporary user interface device may be configured to utilize audio/visual functionality of the temporary user interface device to capture and interpret information about the M2M device. As an example, an image capture feature of the temporary user interface device may be used to capture images of device information associated with the M2M device, such as device identifiers or other information encoded on linear bar codes (sometimes referred to as one-dimensional bar codes), matrix or two-dimensional bar codes (e.g., QR™ codes), data matrix codes, symbolic information such as representations of data as sequences of dots or other symbols, or textual information located on the M2M device. As another example, an audio capture feature of the temporary user interface device may be used to capture spoken information from a user of the device. As another example, rather than relying on the user to input the geographic location of the M2M device, the temporary user interface device may be configured to utilize positioning features of the temporary user interface device (e.g., global position system (GPS), assisted GPS (AGPS), etc.) to automatically identify location information regarding the M2M device to provide to the network-based service. Additionally or alternatively, network-based location (e.g., cell sector or wireless access point location of temporary user interface device) may be utilized.

To further avoid unauthorized device configuration of the M2M device, security of the M2M device configuration process may be enhanced by leveraging attributes of the temporary user interface device (e.g., location of the temporary user interface device) and user attributes (e.g., authentication and/or authorization of a user account of the temporary user interface device). For example, the network-based service may be configured to only accept requests to configure M2M devices to use a user account of the network-based service that are sent from devices authenticated as being associated with the user account (e.g., the user's smartphone or computer). As another example, the network-based service may be configured to only accept requests to configure M2M devices that are sent from a location consistent with the user's geographic location.

Accordingly, through use of the temporary user interface device, cumbersome, complex, and error-prone networked device setup tasks may be securely automated to the point of requiring a bare minimum of user interaction, thereby helping to increase adoption rates of advanced network-based services.

FIG. 1 illustrates an exemplary system 100 facilitating the setup of a M2M device 102 with a network-based service 104. The system 100 includes a M2M device 102 associated with a unique identifier 106 and in communication with a temporary user interface device 114. The system 100 further includes a local network 108 having a network manager 110 configured to authorize device access to the local network 108. The system 100 further includes a communications network 112 connected to the local network 108 over which the network-based service 104 is accessible. A device connection application 116 installed on a memory 118 of the temporary user interface device 114 may be executed by a processor 120 of the temporary user interface device 114 to facilitate the connection of the M2M device 102 to the local network 108 and to the network-based service 104, using features of the temporary user interface device 114 such as audio/video components 122 and other device sensors 124. The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

The M2M device 102 may include any of various types of device that may be configured to communicate with a network-based service 104 in support of the functioning of the network-based service 104. Examples of M2M devices 102 may include alarm sensors for a home security system, cameras for a home automation system, or health monitoring devices for a remote health monitoring system, as some non-limiting examples. In many cases, M2M devices 102 are associated with a user account of the network-based service 104, a particular geographic location, or both.

The M2M device 102 may be configured to connect to one or more network-based services 104. Among other possibilities, exemplary network-based service 104 may include the home security services, a home automation services, and a remote health monitoring services mentioned above. In some connection scenarios, the M2M device 102 may be configured to initiate a connection with the network-based service 104, while in other scenarios, the network-based service 104 may be configured to initiate a connection with the M2M device 102.

The M2M device 102 may be associated with a unique identifier 106 (e.g., a mobile equipment identifier (MEID), a media access control (MAC) address, an international mobile subscriber identity (IMSI), etc.), which in some examples may be a relatively long sequence of digits, letters, and symbols that may not be easily memorized or entered. In some cases, the unique identifier 106 may be printed the on the M2M device 102 itself. As one possibility, the M2M device 102 unique identifier 106 may be included on the M2M device 102 on a label within a battery compartment of the M2M device 102.

The M2M device 102 may be configured to connect to and communicate over the local network 108. Exemplary local networks 108 may include a wide-area network (e.g., a cellular telephone and/or data network), a local-area network (LAN) such as an IEEE 802.11 network, or a personal-area network (PAN) such as an IEEE 802.15.4, Zigbee, Z-Wave or Bluetooth network connection, as some examples. In some cases, multiple local networks 108 may be visible to the M2M device 102. In such a case, the M2M device 102 may be required to be configured to join the correct local network 108 in order to operate correctly.

The network manager 110 may be configured to support authentication and authorization of devices (e.g., M2M devices 102) to the local network 108. As an example, the network manager 110 may be configured to support authorization of M2M devices 102 to the local networks 108 by requiring the network manager 110 to be configured with a unique identifier 106 or address for an authorized M2M device 102. As another example, the network manager 110 may be configured to support authorization of M2M devices 102 to the local networks 108 by requiring the M2M device 102 to be configured with credentials (e.g., obtained from the network manager 110) unique to the local network 108 for authorization by the network manager 110. Thus, the local networks 108 may be configured to utilize the network manager 110 to allow only authorized devices to join the network 108 (e.g., only authorized M2M devices 102). Devices that fail to match the unique identifier 106, address, or credentials maintained by the network manager 110 may accordingly be denied access to the network 108 by the network manager 110.

The communications network 112 may be configured to transport data between devices on the communications network 112, such as one or more M2M devices 102 and the network-based service 104. To do so, communications network 112 may provide communications services, such as packet-switched network services (e.g., Internet access, VoIP communication services), to the devices connected to the communications network 112. Exemplary communications networks 112 may include the PSTN, a VoIP network, a VoLTE (Voice over LTE) network, a cellular telephone network, a fiber optic network, and a cable television network. To facilitate communications, communications devices on the communications network 112 may be associated with unique device identifiers being used to indicate, reference, or selectively connect to the identified device on the communications network 112 (e.g., the M2M device 102 unique identifiers 106 discussed above). Other types of device identifiers may include telephone numbers, mobile device numbers (MDNs), common language location identifier (CLLI) codes, internet protocol (IP) addresses, input strings, and universal resource identifiers (URIs), as some further examples.

The temporary user interface device 114 may be any of various types of device that may be configured to provide a user interface (or an improved user interface) to the M2M device 102. Exemplary temporary user interface devices 114 may include laptop computers, tablet devices, wearable computers, or smartphone devices, as some examples. The temporary user interface device 114 may be configured to serve as a way for a user to interact with the M2M device 102, as needed, to set up or configure the M2M device 102. For example, the configuration of the M2M device 102 may include establishing an ad-hoc data connection between the temporary user interface device 114 and the M2M device 102 to be connected to the network-based service 104, querying or otherwise receiving device information from the M2M device 102 over the established ad-hoc data connection (e.g., a unique identifier 106 of the M2M device 102, information indicative of a type of the M2M device, or any other information useful for authentication and setup of the M2M device 102), setting the M2M device 102 up to access the local network 108, and connecting the M2M device 102 to the network-based service 104 based on the device information received from the M2M device 102.

Temporary user interface device 114 may provide additional functionality for use in set up and connection of the M2M device 102. For example, to facilitate M2M device 102 authentication, the temporary user interface device 114 may be configured to allow the M2M device 102 to temporarily communicate with one or more of the network manager 110 and the network-based service 104 using the network functionality of the temporary user interface device 114. This communication may be performed by the temporary user interface device 114 via communication over the local network 108 or via communication over another communication channel of the temporary user interface device 114, such as via a cellular network connection. Temporary user interface device 114 may further be configured to support ad-hoc data connection to the M2M device 102 without accessing the local network 108, such as by way of a temporary data connection with the M2M device over ad-hoc 802.11, Bluetooth®, NFC, or even a wired data connection as some examples. The ad-hoc data connection may be referred to as ad-hoc, as it may be utilized for the limited purpose of setting up the M2M device to interact with a network-based service over a communications network, and is not required during normal operation of the M2M device once configuration is complete.

In some examples, rather than use of the ad-hoc data connection, the temporary user interface device 114 may connect with the M2M device 102 over the local network 108, such as in examples in which the local network 108 is an open wireless network, and the M2M device 102 and temporary user interface device 114 freely join the open network. In still other examples, the temporary user interface device 114 may connect with the M2M device 102 over a wired connection. However, wired approaches may lack convenience as they may require a user to physically make the wired connection, and may increase M2M device 102 cost or affect its design to require inclusion of a wired port.

In some cases, the temporary user interface device 114 may utilize its validation features that support connection of the temporary user interface device 114 to the system in order to validate the M2M device 102. For example, the temporary user interface device 114 may be associated with a user account, and may use that association with a user account to aid in the validation of the M2M device 102. Accordingly, the M2M device 102 may rely on the validation of the temporary user interface device 114 to the system 100 in order to establish identity or other information related to the M2M device 102.

The temporary user interface device 114 may include one or more audio/video components 122 that may be useful in capturing information about the M2M device 102 without requiring a user to manually enter the information. For instance, an image capture component 122 of the temporary user interface device 114, such as a camera element, may be utilized to visually capture device information such as device identifiers 106, thereby avoiding transcription errors due to incorrect manual entry of device information. As one possibility, the image capture component 122 may be utilized to capture information written on a label affixed to the M2M device 102. As some non-limiting examples of the images that may be captured, the image capture component 122 may be utilized to capture data encoded in a manner suitable for automatic entry, such as by capturing information from a bar code or other encoded information written on, affixed to, etched, or otherwise associated with the M2M device 102 (e.g., linear bar codes, one-dimensional bar codes (e.g., universal product code (UPCs) or European article numbers (EANs) as two examples), data matrix or two-dimensional bar codes (e.g., such as those described in the data matrix barcode International Organization for Standardization/International Electrotechnical Commission ISO/IEC 16022 standard as one example), and symbolic or textual information encoding product serial numbers or other information as some possibilities).

In addition to image capture components 122, additional audio/video components 122 of the temporary user interface device 114 may be leveraged for the purpose of acquiring information about the M2M device 102. For example, an audio capture component 122, such as a microphone, may be utilized to audibly capture device information. As one possibility, a user of the temporary user interface device 114 may elect to read or otherwise say aloud information about the M2M device 102 to be captured as an audio stream by the audio capture component 122 of the temporary user interface device 114. Accordingly a user may be able to identify or otherwise describe the M2M device 102 by voice to the temporary user interface device 114. As another possibility, a user may utilize the audio capture component 122 of the temporary user interface device 114 to receive and recognize audio information provided by the M2M device 102, e.g., for M2M devices 102 capable of providing an audio signal including device information (e.g., device identifier 106).

Other device sensors 124 of the temporary user interface device 114 may also be leveraged for the purposes including acquiring information about the M2M device 102. As an example, GPS sensors 124 may be used to acquire the location of the M2M device 102. As another example, spatial orientation sensors 124, such as compass sensors 124 and/or accelerometer sensors 124, may be used to capture the spatial orientation information regarding the M2M device 102. Spatial orientation information may be useful in various cases, such as in identifying particulars of the location of a home security sensor M2M device 102 as one possibility.

In addition to use in capturing information about the M2M device 102, the audio/video components 122 and sensors 124 of the temporary user interface device 114 may be used to aid in the association of the device connection application 116 with the system 100. For instance, the device connection application 116 may be configured to make use of the audio/video components 122 of the temporary user interface device 114 to acquire information to authenticate the user or user account. As an example, an audio component 122 may be used to receive audio from the user to allow the user to be identified by voice, either by speaking credentials or by recognition of the user's voiceprint. As another example, an image capture component 122 of the temporary user interface device 114 may be used to provide image or video input to allow the temporary user interface device 114 to identify the user by visual biometrics such as face or iris.

The temporary user interface device 114 may include a device connection application 116 stored on a memory 118 of the temporary user interface device 114 that may be executed by one or more processors 120 of the temporary user interface device 114 to perform the operations discussed herein. As discussed in detail below with respect to the process 200 of FIG. 2, when executed by the temporary user interface device 114, the device connection application 116 may facilitate guided connection of the M2M device 102 to the local network 108, and configuration of the M2M device 102 to interact via the established network connection with a network-based service 104.

Figure 2:
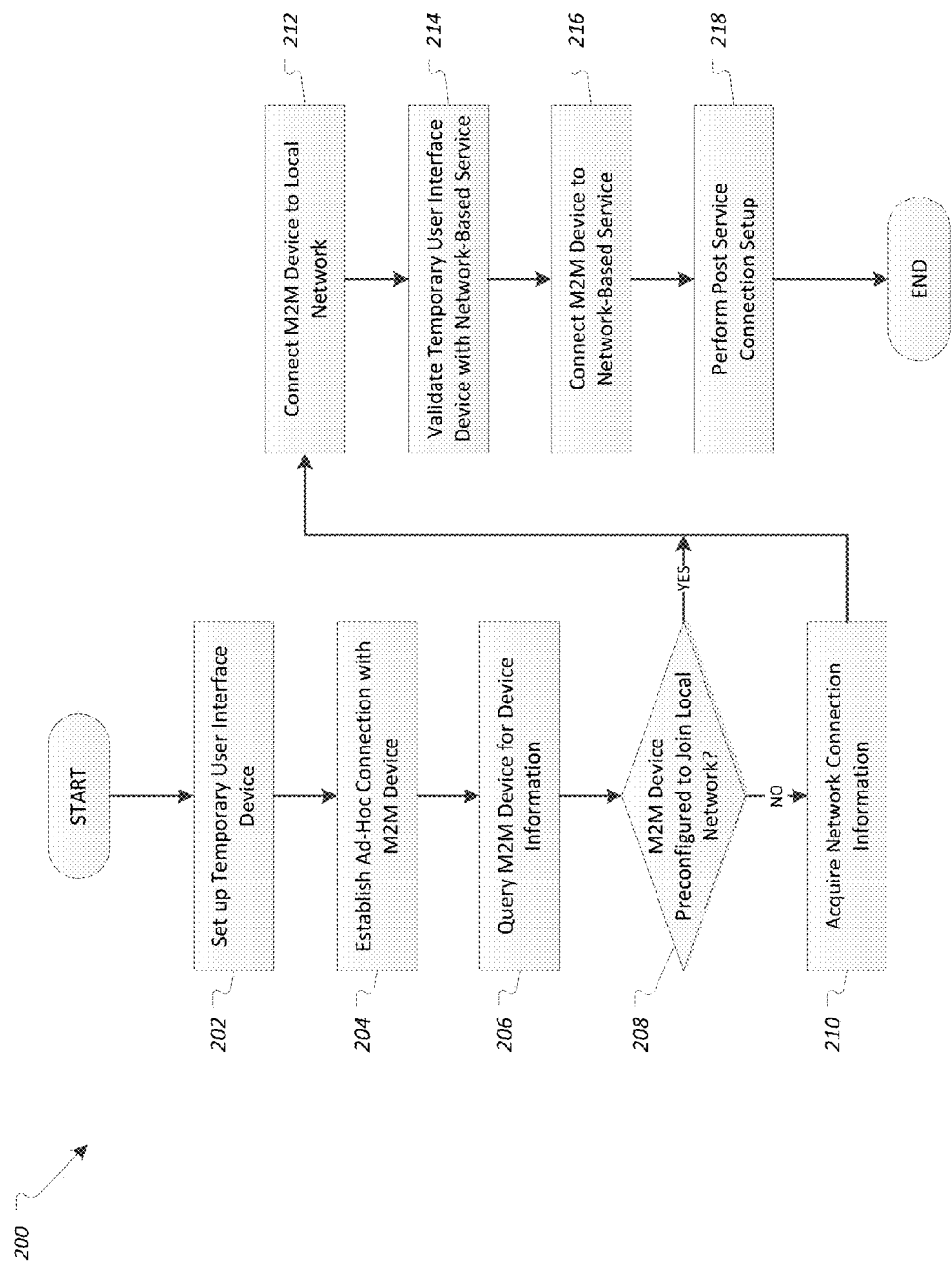
FIG. 2 illustrates an exemplary process for the guided configuration of a M2M device by way of a temporary user interface device.

FIG. 2 illustrates an exemplary process 200 for the guided configuration of a M2M device 102 by way of a temporary user interface device 114. The process 200 may be implemented at least in part by a device connection application 116 executed by the temporary user interface device 114.

In block 202, the device connection application 116 is set up on the temporary user interface device 114. In some cases, the device connection application 116 may be preinstalled on the temporary user interface device 114 as shipped, while in other cases the user may install the device connection application 116 on the temporary user interface device 114. Once installed, the device connection application 116 may be configured to register the temporary user interface device 114 with the network-based service 104. The registration may include, for example, association of a user account of the temporary user interface device 114 with a user account of the network-based service 104, such that the network-based service 104 may identify communications with the temporary user interface device 114 as being associated with the user account. To create the association, the device connection application 116 may be configured to make use of the audio/video components 122 and/or sensors 124 of the temporary user interface device 114 to acquire information to authenticate the user or user account. For example, an audio capture component 122 may be used to receive audio from the user to allow the user to be identified by voice, either by speaking credentials or by recognition of the user's voiceprint. As another example, an image capture component 122 of the temporary user interface device 114 may be used to provide image or video input to allow the temporary user interface device 114 to identify the user by visual biometrics such as face or iris. As yet a further example, a GPS location sensor 124 of the temporary user interface device 114 may be utilized to verify the current location of the temporary user interface device 114 as being a permissible location for the user. Registration of the temporary user interface device 114 with the network-based service 104 may only have to be performed once, and may allow for the network-based service 104 to confirm that requests from the temporary user interface device 114 are associated with the particular user of the temporary user interface device 114.

In block 204, the temporary user interface device 114 establishes an ad-hoc data connection with the M2M device 102. For example, the M2M device 102 may broadcast its ability to create an ad-hoc connection, and may uniquely identify itself by way of the broadcast. The temporary user interface device 114 may be activated and the temporary user interface device 114 and the M2M device 102 may be brought into proximity. Upon detection of the M2M device 102, the temporary user interface device 114 may establish the ad-hoc connection with the M2M device 102. The ad-hoc connection between the temporary user interface device 114 and the M2M device 102 may be established over ad-hoc 802.11, Bluetooth®, or NFC, as some examples.

Thus, prior to connection of the M2M device 102 to the local network 108, the temporary user interface device 114 may be configured to connect to the M2M device 102 by a wireless technology that supports ad-hoc connections. Notably, the ad-hoc data connection to the M2M device 102 may or may not be over the same underlying radio technology as the technology of the local network 108. While a temporary user interface device 114 may connect to the M2M device 102 via any ad-hoc wireless technology, NFC may be particularly well-suited for this purpose because it is simple (physical proximity is substantially all that is required in order to initiate a connection) and secure (the requirement for physical proximity ensures that surreptitious connections are unlikely to be made).

In block 206, the temporary user interface device 114 queries the M2M device 102 for device information. For example, the device connection application 116 may be configured to cause the temporary user interface device 114 to query the M2M device 102 over the established ad-hoc data connection to identify information about the M2M device 102. As another example, the temporary user interface device 114 may simply receive information broadcast from the M2M device 102 without requiring a query for information. Exemplary identified information may include a type of the M2M device 102, network capabilities of the M2M device 102, a device identifier of the M2M device 102, or any other information relevant to connection of the M2M device 102 to the wireless network 108 or network-based service 104.

As yet another example, the device connection application 116 may utilize an image capture component 122 of the temporary user interface device 114 to acquire information about the M2M device 102 (e.g., one or more of linear bar codes, one-dimensional bar codes, data matrix codes, two-dimensional bar codes, symbolic information, or textual information printed on a label of the M2M device 102). As a further example, the device connection application 116 may utilize an audio capture component 122 of the temporary user interface device 114 to acquire information about the M2M device 102 (e.g., by decoding information read off the M2M device 102 by a user, by decoding information provided audibly by the M2M device 102). Use of captured image or audible information about the M2M device 102 may be relatively error-free as compared to typing in lengthy or difficult to read information.

In cases where some user interaction may be required to facilitate the retrieval of particular elements of information, the device connection application 116 may utilize audio/video components 122 of the temporary user interface device 114 to guide the user through providing the information that may be required. As one possibility, the device connection application 116 may display a form with fields to receive the network identity and credential information. For each element of data of the form, the device connection application 116 may be configured to allow for one or more of image capture, audio capture, or manual entry of the requested information. The user may accordingly select image capture to take a picture of the requested information (e.g., to capture a picture of the M2M device 102 including serial number or other information relating to the M2M device 102), select audio capture to read off or cause the M2M device 102 to provide audio output including the requested information, or simply type in the relevant information into a touch screen keyboard or physical keyboard of the temporary user interface device 114.

As another possibility, the device connection application 116 may display a guided or wizard type interface, including a sequence of user interface screens configured to walk the user through retrieval of the information from the M2M device 102. As a further possibility, the device connection application 116 may instead or may additionally provide audio guidance to the user of the temporary user interface device 114 to explain what information is required. As one example, the device connection application 116 may provide audio prompts to the user, and may receive spoken responses from the user to facilitate the configuration of the device without requiring manual entry of M2M device 102 information. As another example, the device connection application 116 may display a picture of the M2M device 102, highlighting a location on the device 102 where the required information is to be located and captured or manually entered. To provide the display, the device connection application 116 may direct an image capture component 122 of the temporary user interface device 114 to capture a picture of the M2M device 102, and may use image recognition to recognized parts of the M2M device and overlay instructions onto a display of the captured image to guide the user.

In decision point 208, the temporary user interface device 114 determines whether the M2M device 102 is preconfigured to autonomously join the local network 108. For example, the device connection application 116 may determine that the M2M device 102 includes authorization credentials that may be used to connect to the local network 108 via the network manager 110, or that the network manager 110 is configured with the unique identifier 106 or other information of the M2M device 102. If the device connection application 116 identifies that, based on the queried device information, the M2M device 102 may be able to connect to the local network 108 without further configuration, control passes to block 212. Otherwise, control passes to block 210.

In block 210, the temporary user interface device 114 configures the M2M device 102 and local network 108 to connect. For example, the device connection application 116 may be configured to cause the temporary user interface device 114 to acquire network identity and credentials from one or more of the network manager 110 and the network-based service 104. Based on the acquired information, the device connection application 116 may be configured to cause the temporary user interface device 114 to configure the M2M device 102. In some cases, the device connection application 116 may be further configured to cause one or more of the network manager 110 and the network-based service 104 to authorize the M2M device 102 to join the local network 108. As another example, the device connection application 116 may be configured to provide the network manager 110 with the unique identifier 106 or other information of the M2M device 102 to allow the M2M device 102 to be authorized to join the local network 108.

In block 212, the M2M device 102 connects to the local network 108. For example, the M2M device 102 may provide network identity information and network credentials received from the temporary user interface device 114 to the network manager 110 over the local network 108. As another example, the network manager 110 may identify and allow the M2M device 102 to join the local network 108 based on confirmation of a unique identifier 106 or other information regarding the M2M device with a listing of authorized devices. The configuration information may be preserved by one or more of the M2M device 102, network manager 110, and network-based service 104 to facilitate the M2M device 102 later rejoining the local network 108 as necessary. Once the M2M device 102 is connected to the local network 108, the temporary user interface device 114 may be configured to continue to communicate with the M2M device 102 over the ad-hoc data connection, or may be configured to connect to the M2M device 102 via the local network 108 instead of continuing to make use of the ad-hoc data connection.

In block 214, the temporary user interface device 114 validates the temporary user interface device 114 with the network-based service 104. For example, the device connection application 116 may be configured to cause the temporary user interface device 114 to provide credentials or identifiers associated with the temporary user interface device 114 (or with a user account of the temporary user interface device 114) to the network-based service 104. This may accordingly allow the network-based service 104 to authenticate requests from the temporary user interface device 114 to connect M2M devices 102 as being associated with the user account of the temporary user interface device 114.

In block 216, the temporary user interface device 114 connects the M2M device 102 with the network-based service 104. For example, the device connection application 116 may be configured to cause the temporary user interface device 114 to configure the M2M device 102 with information useful for connection of the M2M device 102 with the network-based service 104, such as network address information of the network-based service 104, credential information to log into the network-based service 104 (e.g., username, password), or other additional connection information (e.g., data encodings, network protocol versions, etc.). As another example, the device connection application 116 may be configured to cause the temporary user interface device 114 to query the M2M device 102 or the network manager 110 for connection information such as network address, credentials, or other additional information in order for the network-based service 104 to connect to the M2M device 102. The device connection application 116 may be further configured to provide the network-based service 104 with information regarding the M2M device 102. Based on the configured information, a network connection may accordingly be established between the network-based service 104 and the M2M device 102.

In block 218, the temporary user interface device 114 performs any additional configuration of the M2M device 102 that may be required after connection of the M2M device 102 to the network-based service 104. The additional information may include, for example, a name or other identifier of the M2M device 102, or a description of the location of the M2M device 102. As one example, information regarding the location of the M2M device 102 may be automatically determined using GPS functionality of the temporary user interface device 114, and may be provided to the network-based services 104 to indicate the precise location of the M2M device 102. The device connection application 116 may be configured to cause the temporary user interface device 114 to receive the additional information, and to provide the additional information to the network-based service 104. After block 218, the process 200 ends.

Accordingly, the systems and methods described above eliminate many of the cumbersome, complex and error-prone user actions formerly required to set up a M2M device 102 with a network-based service 104. Once an initial setup of the device connection application 116 and temporary user interface device 114 had been accomplished, setup of an M2M device 102 may be as simple as placing the temporary user interface device 114 in the proximity to the M2M device 102, and providing user entry of any information not automatically discoverable by the temporary user interface device 114, such as a user-defined name information or other user-determined identifiers used describe the M2M device 102.

In general, computing systems and/or devices such as the temporary user interface device 114 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the temporary user interface device 114 generally include computer-executable instructions such as the instructions of the device connection application 116, where the instructions may be executable by one or more processors 120. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor 120 or microprocessor receives instructions, e.g., from a memory 118, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor 120 of a computing device). Such a medium may take many forms, including, but not limited to, non-volatile media and volatile media. Non-volatile media may include, for example, optical or magnetic disks and other persistent memory 118. Volatile media may include, for example, dynamic random access memory 118 (DRAM), which typically constitutes a main memory 118. Such instructions may be transmitted by one or more transmission media, including coaxial cables, copper wire and fiber optics, including the wires that comprise a system bus coupled to a processor 120 of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory 118 chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The device connection application 116 may be such a computer program product. In some example, the device connection application 116 may be provided as software that when executed by the processor 120 provides the operations described herein. Alternatively, the device connection application 116 may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device configured to execute a device connection application on a processor of the computing device to provide operations comprising:
   establishing an ad-hoc data connection between the computing device and a machine-to-machine device, the machine-to-machine device being without a display screen, the establishing including:
      configuring, by the computing device, set up of the machine-to-machine device by the device connection application, and
      acquiring information, by a spatial orientation sensor, to authenticate a user and to interact with a network-based service using a user account to identify the user of the computing device that is registered with the network-based service;

receiving device information, by the device connection application in communication with the machine-to-machine device over the established ad-hoc data connection, including spoken information describing, without manual entry of the device information, the machine-to-machine device in response to a prompt and using audio capture functionality of the computing device to acquire an audio stream including the device information about the machine-to-machine device for setup of the machine-to-machine device; and connecting the machine-to-machine device to the network-based service based on the device information received from the machine-to-machine device and according to authentication of the computing device as being associated with the user account.

2. The computing device of claim 1, wherein the ad-hoc data connection between the computing device and a machine-to-machine device includes at least one of a near-field communication connection, an ad-hoc wireless connection, and a wired data connection.

3. The computing device of claim 1, wherein the computing device does not maintain connection to the machine-to-machine device once the machine-to-machine device is set up.

4. The computing device of claim 1, further providing for operations comprising connecting the machine-to-machine device to a local network over which the network-based service is reachable by at least one of:

configuring a network manager of the local network with device information received from the machine-to-machine device; and configuring the machine-to-machine device with credentials of the network manager for connection to the local network.

5. The computing device of claim 1, further providing for operations comprising:

identifying, based on the querying of the machine-to-machine device for device information, at least one element of information not automatically discovered by the computing device; and querying a user of the computing device for the at least one element of information to complete the configuration.

6. The computing device of claim 1, further providing for operations comprising:

registering the computing device with the network-based service; and providing the credentials associated with the computing device to the network-based service to allow the network-based service to authenticate requests from the computing device as associated with a user of the computing device.

7. The computing device of claim 1, further providing for operations comprising:

identifying the machine-to-machine device to the network-based service according to spatial orientation information determined based on a spatial orientation feature of the spatial orientation sensor including a compass sensor and an accelerometer sensor of the computing device.

8. The computing device of claim 7, further comprising using image capture functionality of the computing device to acquire an image including encoded information about the machine-to-machine device formatted as at least one of a bar code, a data matrix code, a two-dimensional code, symbolic information and textual information.

9. A method, comprising:

establishing an ad-hoc data connection between a computing device and a machine-to-machine device, the machine-to-machine device being without a display screen, and the computing device configured to set up the machine-to-machine device by a device connection application to acquire information using a spatial orientation sensor to authenticate a user and to interact with a network-based service using a user account to identify the user of the computing device that is registered with the network-based service;

receiving device information, by the device connection application in communication with the machine-to-machine device over the established ad-hoc data connection, describing the machine-to-machine device including the device information about the machine-to-machine device for setup of the machine-to-machine device; and connecting the machine-to-machine device to the network-based service based on the device information received from the machine-to-machine device and according to authentication of the computing device as being associated with the user account.

10. The method of claim 9, wherein the ad-hoc data connection between the computing device and a machine-to-machine device includes at least one of a near-field communication connection, an ad-hoc wireless connection, and a wired data connection.

11. The method of claim 9, further comprising connecting the machine-to-machine device to a local network over which the network-based service is reachable by at least one of:

configuring a network manager of the local network with device information received from the machine-to-machine device; and configuring the machine-to-machine device with credentials obtained from the network manager for connection to the local network.

12. The method of claim 9, further comprising:

identifying, based on the querying of the machine-to-machine device for device information, at least one element of information not automatically discovered by the computing device; and querying a user of the computing device for the at least one element of information to complete the configuration.

13. The method of claim 9, further comprising:

registering the computing device with the network-based service; and providing credentials associated with the computing device to the network-based service to allow the network-based service to authenticate requests from the computing device as associated with a user of the computing device.

14. The method of claim 9, further comprising:

identifying the machine-to-machine device to the network-based service according to spatial orientation information determined based on a spatial orientation feature of the spatial orientation sensor including a compass sensor and an accelerometer sensor of the computing device.

15. The method of claim 14, further comprising using image capture functionality of the computing device to acquire an image including encoded information about the machine-to-machine device formatted as at least one of a bar code, a data matrix code, a two-dimensional code, symbolic information and textual information.

16. A non-transitory computer readable medium storing a device connection software program, the device connection software program being executable by a processor of a computing device to provide operations comprising:
    establishing an ad-hoc data connection between the computing device and a machine-to-machine device, the machine-to-machine device being without a display screen, the computing device configured to set up the machine-to-machine device by the device connection application to acquire information using a spatial orientation sensor to authenticate a user and to interact with a network-based service using a user account to identify the user of the computing device that is registered with the network-based service;
    receiving device information, by the device connection application in communication with the machine-to-machine device over the established ad-hoc data connection, including spoken information describing, without manual entry of the device information, the machine-to-machine device in response to an audio prompt and using audio capture functionality of the computing device to acquire an audio stream including the device information about the machine-to-machine device for setup of the machine-to-machine device; and
    connecting the machine-to-machine device to the network-based service based on the device information received from the machine-to-machine device and according to authentication of the computing device as being associated with the user account.

17. The non-transitory computer readable medium of claim 16, wherein the ad-hoc data connection between the computing device and a machine-to-machine device includes at least one of a near-field communication connection, an ad-hoc wireless connection, and a wired data connection.

18. The non-transitory computer readable medium of claim 16, further providing for operations comprising connecting the machine-to-machine device to a local network over which the network-based service is reachable by at least one of:
    configuring a network manager of the local network with device information received from the machine-to-machine device; and
    configuring the machine-to-machine device with credentials obtained from the network manager for connection to the local network.

19. The non-transitory computer readable medium of claim 16, further providing for operations comprising:
    identifying, based on the querying of the machine-to-machine device for device information, at least one element of information not automatically discovered by the computing device; and
    querying a user of the computing device for the at least one element of information to complete the configuration.

20. The non-transitory computer readable medium of claim 16, further providing for operations comprising:
    registering the computing device with the network-based service; and
    providing credentials associated with the computing device to the network-based service to allow the network-based service to authenticate requests from the computing device as associated with a user of the computing device.

21. The non-transitory computer readable medium of claim 16, further providing for operations comprising:
    identifying the machine-to-machine device to the network-based service according to spatial orientation information determined based on a spatial orientation feature of the spatial orientation sensor including a compass sensor and an accelerometer sensor of the computing device.

22. The non-transitory computer readable medium of claim 21, further comprising using image capture functionality of the computing device to acquire an image including encoded information about the machine-to-machine device formatted as at least one of a bar code, a data matrix code, a two-dimensional code, symbolic information and textual information.

* * * * *